United States Patent [19]

Kurahashi et al.

[11] Patent Number: 5,403,664
[45] Date of Patent: Apr. 4, 1995

[54] MARBLE-LIKE GLASS CERAMIC

[75] Inventors: Toyohide Kurahashi; Yoshio Hashibe; Masayuki Ninomiya, all of Shiga, Japan

[73] Assignee: Nippon Electric Glass Co., Ltd., Otsu, Japan

[21] Appl. No.: 59,833

[22] Filed: May 10, 1993

[30] Foreign Application Priority Data

May 11, 1992 [JP] Japan ................................ 4-144868
Dec. 29, 1992 [JP] Japan ................................ 4-361426

[51] Int. Cl.$^6$ ............................................ C03C 10/00
[52] U.S. Cl. ...................................... 428/426; 501/17; 501/18; 501/70; 501/71; 501/72; 501/65; 428/15; 65/33.1
[58] Field of Search ................... 428/15, 426; 65/33; 561/17, 18, 70, 71, 65, 72

[56] References Cited

U.S. PATENT DOCUMENTS

| | | | |
|---|---|---|---|
| 3,841,856 | 10/1974 | Bondarev et al. | 65/33 |
| 3,955,989 | 5/1976 | Nakamura | 65/33 |
| 3,964,917 | 6/1976 | Nakamura | 65/33 |
| 4,054,435 | 10/1977 | Sakane et al. | 65/53 |
| 4,119,434 | 10/1978 | Kroyer | 106/306 |
| 4,173,484 | 11/1979 | Kubovits et al. | 65/33 |
| 5,061,307 | 10/1991 | Matano et al. | 65/18.4 |
| 5,066,524 | 11/1991 | Baba et al. | 428/15 |
| 5,089,345 | 2/1992 | Hashibe et al. | 428/426 |
| 5,210,057 | 5/1993 | Hann et al. | 501/72 |
| 5,275,978 | 1/1994 | Shibuya et al. | 501/17 |

FOREIGN PATENT DOCUMENTS

| | | |
|---|---|---|
| 51-23966 | 7/1976 | Japan. |
| 53-39884 | 10/1978 | Japan. |
| 3-164446 | 7/1991 | Japan. |
| 91-9979 | 12/1991 | Rep. of Korea. |

*Primary Examiner*—A. A. Turner
*Attorney, Agent, or Firm*—Collard & Roe

[57] ABSTRACT

Marble-like glass ceramic which consists essentially of, by weight percent, 50-75% $SiO_2$, 1-15% $Al_2O_3$, 6-16.5% CaO, 0.1-5% $Li_2O$, 0-1.5% $B_2O_3$, 10-17.5% $CaO+Li_2O+B_2O_3$, 2.5-12% ZnO, 0-12% BaO, 0.1-15% $Na_2O+K_2O$, and 0-10% coloring agents, said ceramic comprising $\beta$-wollastonite precipitated as a major crystal. The coloring agents comprises at least one selected from a group of $Fe_2O_3$, NiO, CoO, $MnO_2$, $Cr_2O_3$, and CuO. The marble-like glass ceramic may further comprises at least one of $As_2O_3$ and $Sb_2O_3$ of up to 1% as refining agents, at least one of up to 1.5% MgO and up to 1.5% SrO so as to improve meltability of the glass, and at least one of up to 1% $TiO_2$, up to 1% $ZrO_2$, and up to 1% $P_2O_5$ so as to make the glass stable and less devitrifiable.

5 Claims, No Drawings

MARBLE-LIKE GLASS CERAMIC

BACKGROUND OF THE INVENTION

The present invention relates to glass ceramics and, in particular, to marble-like glass ceramics which are used for interior and exterior materials in buildings.

U.S. Pat. No. 3,964,917 (Reference I) corresponding to JP-B-51-23966 (Tokuko-Sho 51-23966) discloses a marble-like glass ceramic which is obtained from a thermally crystallizable composition consisting essentially of 50–65 wt % $SiO_2$, 3–13 wt % $Al_2O_3$, 15–25 wt % CaO, and 2–10 wt % ZnO when heat treated to convert at least a portion of the surface layer to crystals of $\beta$-wollastonite.

JP-B-53-39884 (Tokuko-Sho 53-39884 - Reference II) discloses a marble-like glass ceramic consisting essentially of 45–75 wt % $SiO_2$, 1–13 wt % $Al_2O_3$, 6–14.5 wt % CaO, 1–13 wt % $Na_2O+K_2O$, 0–20 wt % BaO and 0–18 wt % ZnO, 4–24 wt % BaO+ZnO and comprising $\beta$-wollastonite as the major crystal.

Those known glass ceramics are low in color tone stability due to variation of the heat treatment condition. That is, if it is heat treated at a condition slightly apart from the optimum condition, the precipitated amount of crystals changes considerably so that the color tone is changed from a desired one. This makes the large-scaled production of glass ceramics difficult.

Korean Patent (KP-B-) 91-9979 (Reference III) discloses a marble-like glass ceramic which is obtained from a thermally crystallizable composition consisting essentially of 55–63 wt % $SiO_2$, 5–10 wt % $Al_2O_3$, 17–22 wt % CaO, and 0.5–3 wt % $Li_2O$ when heat treated to convert at least a portion of the surface layer to crystals of $\beta$-wollastonite.

The glass ceramic disclosed in Reference III is devitrifiable and is not good in meltability, so that it is difficult to form an article of the glass ceramic. Further, crystal amount is so much that it is difficult to produce the glass ceramic with a dark color.

JP-A-3-164446 (Tokukai-Hei 3-164446 - Reference IV) discloses a glass ceramic consisting essentially of 48–68 wt % $SiO_2$, 0.5–17 wt % $Al_2O_3$, 6–22 wt % CaO, 5–22 wt % $R_2O$ (R: Na, K), 0.2–8 wt % MgO, 0–6 wt % $B_2O_3$, 0–8 wt % BaO, 0–9 wt % ZnO, less than 15 wt % BaO+ZnO, and 0–10 wt % coloring agents and comprising $\beta$-wollastonite as the major crystal.

The glass ceramic disclosed in Reference IV is devitrifiable and is not good in the color tone stability.

SUMMARY OF THE INVENTION

Therefore, it is an object of the present invention to provide marble like glass ceramic which is excellent in the color tone stability and is low in devitrification to enable the large-scaled production.

According to the present invention, marble-like glass ceramic can be obtained which consists essentially of, by weight percent, 50–75% $SiO_2$, 1–15% $Al_2O_3$, 6–16.5% CaO, 0.1–5% $Li_2O$, 0–1.5% $B_2O_3$, 10–17.5% $CaO+Li_2O+B_2O_3$, 2.5–12% ZnO, 0–12% BaO, 0.1–15% $Na_2O+K_2O$ and 0–10% coloring agents, the ceramic comprising $\beta$-wollastonite precipitated as a major crystal.

The coloring agents may comprise at least one selected from a group of $Fe_2O_3$, NiO, CoO, $MnO_2$, $Cr_2O_3$, and CuO.

The marble-like glass ceramic may further comprise at least one of $As_2O_3$ and $Sb_2O_3$ of up to 1% as refining agents.

The marble-like glass ceramic may also further comprise at least one of up to 1.5% MgO and up to 1.5% SrO so as to improve meltability of the glass.

Further, the marble-like glass ceramic may also comprise at least one of up to 1% $TiO_2$, up to 1% $ZrO_2$, and up to 1% $P_2O_5$ so as to make the glass stable and less devitrifiable.

DESCRIPTION OF THE PREFERRED EMBODIMENTS

The marble-like glass ceramic of the present invention consists essentially of, by weight percent, 50–75%, preferably 57–70%, of $SiO_2$, 1–15%, preferably 3–10%, of $Al_2O_3$, 6–16.5%, preferably 8–16%, of CaO, 0.1–5%, preferably 0.1–3%, of $Li_2O$, 0–1.5%, preferably 0–1%, of $B_2O_3$, 10–17.5% $CaO+Li_2O+B_2O_3$, 2.5–12% preferably 2.9–9%, of ZnO, 0–12%, preferably 0–7%, of BaO, 0.1–15%, preferably 3–12% of $Na_2O+K_2O$ and 0–10% coloring agents the ceramic comprising $\beta$-wollastonite precipitated as a major crystal.

The reasons for the above limitations on each ingredients of the glass ceramic composition of the present invention are as follows.

If the $SiO_2$ content is greater than 75 wt %, the fusion temperature of the glass is elevated and the viscosity increases to lower the flowability during heat treatment. If less than 50 wt %, devitrifiability is increased and $\beta$-wollastonite precipitated by the heat treatment decreases to lower the mechanical strength.

If the $Al_2O_3$ content is more than 15 wt %, the meltability and the color tone stability of the glass is poor. If less than 1 wt %, the devitrification increases and the chemical resistance is lowered.

CaO, $Li_2O$ and $B_2O_3$ are ingredients relating to the color tone stability. In order to insure the excellent color tone stability, it is required to suppress the devitrification of the glass with a high crystallizing rate and to control the crystal into an optimum amount. To this end, it is important to contain a controlled amount of CaO and $Li_2O$ in the glass and further to limit the total amount of CaO, $Li_2O$ and $B_2O_3$ within 10–17.5 wt %.

CaO is an ingredient for increasing the crystallizing rate and amount of the crystal and for stabilizing the color tone of the glass ceramic. If the CaO content is more than 16.5 wt %, devitrifiability is increased and forming is difficult. Further, $\beta$-wollastonite is precipitated excessively so that a desired surface flatness is not obtained and that coloring by the coloring agent is suppressed to realize the dark color. If less than 6 wt %, $\beta$-wollastonite is precipitated with a reduced amount so that the color tone stability is poor to result in no marble-like appearance. Further, the mechanical strength is decreased insufficient to be used for building materials.

$Li_2O$ is for increasing the crystallizing rate. If the $Li_2O$ content is more than 5 wt %, the chemical resistance of the glass ceramic is poor. If less than 0.1 wt %, the meltability and flowability of the glass are poor, and the crystallizing rate is decreased to result in the low color tone stability.

$B_2O_3$ is an ingredient for improving the meltability and the flowability of the glass and for increasing the crystallizing rate. Although a small amount of $B_2O_3$ content results in increase of the crystallizing rate, content of more than 1.5 wt % reversely decreases the crystallizing rate to degrade the color tone stability.

Each of CaO, Li$_2$O and B$_2$O$_3$ has a function for decreasing the viscosity of the glass. Therefore, use of increased amount of CaO, Li$_2$O and B$_2$O$_3$ increases the devitrifiability of the glass.

Especially, the total content more than 17.5 wt % considerably increases the devitrification to make production of the glass ceramic difficult. If the total content is less than 10 wt %, the viscosity of the glass is increased excessively and decreases the crystallizing rate to lower the color tone stability with a reduced amount of the crystal.

If ZnO content is more than 12 wt %, β-wollastonite hardly precipitates to result in absence of marble-like appearance and the sufficient mechanical strength. If less than 2.5 wt %, the flowability is poor.

If the total content of Na$_2$O and K$_2$O is more than 15 wt %, the chemical resistance is degraded. If less than 0.1 wt %, the viscosity increases and the meltability and the flowability are also degraded.

The coloring agents such as Fe$_2$O$_3$, NiO, CoO, MnO$_2$, Cr$_2$O$_3$, CuO and others can be contained up to 10 wt %. However, if the content of the coloring agent is more than 10 wt %, the flowability is considerably lowered during the heat treatment, while the cost is increased.

The marble-like glass ceramic may further comprise at least one of As$_2$O$_3$ and Sb$_2$O$_3$ of up to 1 wt % as refining agents. The content more than 1 wt % is not desired from the view point of the environment pollution.

The marble-like glass ceramic may also further comprise at least one of up to 1.5% MgO and up to 1.5 wt % SrO so as to improve meltability of the glass. However, the content more than 1.5 wt % of MgO or SrO badly affects crystallization and degrades the color tone stability.

Further, the marble-like glass ceramic may also comprise at least one of up to 1 wt % TiO$_2$, up to 1 wt % ZrO$_2$, and up to 1 wt % P$_2$O$_5$ so as to make the glass stable and less devitrifiable. The content of TiO$_2$ more than 1 wt % make the glass ceramic expensive and makes the glass ceramic yellowish. The content of ZrO$_2$ more than 1 wt % lowers the meltability of the glass. The content of P$_2$O$_5$ more than 1 wt % causes phase separation in the glass.

Now, a method for producing the glass ceramic of the present invention will be described below.

Raw materials are blended and mixed into the above-mentioned composition and are melted into the molten glass. Then, the molten glass is poured into water and quenched thereby forming small glass masses. The small glass masses are placed and accumulated in a refractory mold of a desired shape, and are subjected to a heat treatment. By the heat treatment, the small glass masses softened and deformed, and integrally fusion-bonded to one another, and at the same time, needle-like β-wollastonite crystals precipitate inwardly from the surface of each of the small glass masses. Thus, a glass ceramic article of a desired shape is produced. When the surface of the glass ceramic article is polished, it has a marble-like appearance due to the shape of each of small masses.

The glass ceramic articles having various colored patterns can be produced by, for example, mixing small glass masses with inorganic pigments and accumulating the mixture in the mold, or by accumulating small glass masses having different colors.

The present invention will now be explained in detail with reference to the following examples which are given for illustration of the invention and are not intended to be limiting thereof.

Tables 1 to 4 show examples (Samples Nos. 1 to 15) of the present invention and comparing examples (Samples Nos. 16–19).

Each of samples was produced by the following method.

TABLE 1

| INGREDIENTS (wt %) | SAMPLE | | | | |
|---|---|---|---|---|---|
| | 1 | 2 | 3 | 4 | 5 |
| SiO$_2$ | 61.0 | 60.0 | 69.0 | 64.0 | 61.0 |
| Al$_2$O$_3$ | 6.0 | 7.0 | 3.0 | 5.0 | 6.0 |
| CaO | 16.0 | 14.0 | 9.0 | 14.0 | 16.0 |
| Li$_2$O | 1.0 | 0.5 | 2.5 | 1.0 | 0.5 |
| B$_2$O$_3$ | — | — | — | — | — |
| ZnO | 6.0 | 9.0 | 3.0 | 6.0 | 6.0 |
| BaO | 5.0 | 2.0 | 4.5 | 5.0 | 5.0 |
| Na$_2$O | 3.0 | 4.0 | 7.0 | 3.0 | 3.5 |
| K$_2$O | 2.0 | 3.5 | 2.0 | 2.0 | 2.0 |
| MgO | — | — | — | — | — |
| NiO | — | — | — | — | — |
| CoO | — | — | — | — | — |
| Fe$_2$O$_3$ | — | — | — | — | — |
| MnO | — | — | — | — | — |
| OPTIMUM TREATING TEMPERATURE (°C.) | 1080 | 1060 | 1000 | 1040 | 1100 |
| OPTIMUM HEATING & COOLING RATE (°C./h) | 60 | 60 | 60 | 60 | 60 |
| COLOR | white | white | white | white | white |
| ACID RESISTANCE (mg/cm$^2$) | 0.10 | 0.06 | 0.13 | 0.04 | 0.08 |
| ALKALI RESISTANCE (mg/cm$^2$) | 0.45 | 0.43 | 0.40 | 0.46 | 0.45 |
| BENDING STRENGTH (kgf/cm$^2$) | 500 | 450 | 410 | 450 | 500 |
| COLOR DIFFERENCE (ΔE) | 0.2 | 0.8 | 1.0 | 0.5 | 0.4 |

TABLE 2

| INGREDIENTS (wt %) | SAMPLE | | | | |
|---|---|---|---|---|---|
| | 6 | 7 | 8 | 9 | 10 |
| SiO$_2$ | 60.0 | 69.0 | 63.0 | 63.0 | 64.0 |
| Al$_2$O$_3$ | 7.0 | 5.0 | 3.0 | 6.0 | 5.0 |
| CaO | 14.0 | 9.0 | 14.0 | 15.0 | 14.0 |
| Li$_2$O | 0.2 | 1.5 | 1.0 | 1.0 | 1.0 |
| B$_2$O$_3$ | 0.3 | — | 1.0 | — | — |
| ZnO | 9.0 | 3.0 | 6.0 | 5.0 | 6.0 |
| BaO | 2.0 | 4.5 | 5.0 | 4.0 | 4.0 |
| Na$_2$O | 4.0 | 8.0 | 3.0 | 5.0 | 3.0 |
| K$_2$O | 3.5 | 2.0 | 2.0 | 1.0 | 2.0 |
| MgO | — | — | — | — | 1.0 |
| NiO | — | — | — | — | — |
| CoO | — | — | — | — | — |
| Fe$_2$O$_3$ | — | — | — | — | — |
| MnO | — | — | — | — | — |
| OPTIMUM TREATING TEMPERATURE (°C.) | 1050 | 1020 | 1030 | 1060 | 1040 |
| OPITIMUM HEATING & COOLING RATE (°C./h) | 60 | 60 | 60 | 60 | 60 |
| COLOR | white | white | white | white | white |
| ACID RESISTANCE (mg/cm$^2$) | 0.05 | 0.10 | 0.04 | 0.06 | 0.04 |
| ALKALI RESISTANCE | 0.43 | 0.40 | 0.45 | 0.46 | 0.46 |

TABLE 2-continued

| INGREDI- ENTS (wt %) | SAMPLE | | | | |
|---|---|---|---|---|---|
| | 6 | 7 | 8 | 9 | 10 |
| (mg/cm$^2$) | | | | | |
| BENDING STRENGTH (kgf/cm$^2$) | 450 | 410 | 450 | 460 | 460 |
| COLOR DIFFERENCE ($\Delta$E) | 0.7 | 1.2 | 0.4 | 0.2 | 1.0 |

TABLE 3

| INGREDI- ENTS (wt. %) | SAMPLE | | | | |
|---|---|---|---|---|---|
| | 11 | 12 | 13 | 14 | 15 |
| SiO$_2$ | 63.9 | 63.6 | 63.8 | 63.5 | 65.6 |
| Al$_2$O$_3$ | 5.0 | 5.0 | 5.0 | 5.0 | 2.9 |
| CaO | 14.0 | 14.0 | 14.0 | 14.0 | 8.5 |
| Li$_2$O | 1.0 | 1.0 | 1.0 | 1.0 | 2.4 |
| B$_2$O$_3$ | — | 0.3 | — | 0.3 | — |
| ZnO | 6.0 | 6.0 | 6.0 | 6.0 | 2.9 |
| BaO | 5.0 | 5.0 | 5.0 | 5.0 | 4.3 |
| Na$_2$O | 3.0 | 3.0 | 3.0 | 3.0 | 6.6 |
| K$_2$O | 2.0 | 2.0 | 2.0 | 2.0 | 1.9 |
| MgO | — | — | — | — | — |
| NiO | 0.1 | 0.1 | 0.1 | 0.1 | — |
| CoO | — | — | 0.05 | 0.05 | 0.3 |
| Fe$_2$O$_3$ | — | — | — | — | 3.8 |
| MnO | — | — | — | — | 0.8 |
| OPTIMUM TREATING TEMPERATURE (°C.) | 1040 | 1030 | 1040 | 1030 | 1000 |
| OPITMUM HEATING & COOLING RATE (°C./h) | 60 | 60 | 60 | 60 | 60 |
| COLOR | beige | beige | gray | gray | black |
| ACID RESISTANCE (mg/cm$^2$) | 0.05 | 0.05 | 0.06 | 0.06 | 0.13 |
| ALKALI RESISTANCE (mg/cm$^2$) | 0.47 | 0.47 | 0.48 | 0.48 | 0.43 |
| BENDING STRENGTH (kgf/cm$^2$) | 440 | 440 | 440 | 440 | 400 |
| COLOR DIFFERENCE ($\Delta$E) | 0.7 | 0.6 | 0.7 | 0.6 | 1.2 |

TABLE 4

| INGREDI- ENTS (wt %) | SAMPLE | | | |
|---|---|---|---|---|
| | 16 | 17 | 18 | 19 |
| SiO$_2$ | 64.8 | 61.8 | 64.8 | 57.8 |
| Al$_2$O$_3$ | 7.0 | 5.0 | 7.0 | 7.0 |
| CaO | 12.0 | 13.0 | 8.0 | 16.0 |
| Li$_2$O | — | 1.0 | 1.0 | 1.0 |
| B$_2$O$_3$ | — | 3.0 | 0.5 | 1.0 |
| ZnO | 7.0 | 6.0 | 7.0 | 6.0 |
| BaO | 4.0 | 5.0 | 4.0 | 4.5 |
| Na$_2$O | 3.0 | 3.0 | 4.5 | 3.5 |
| K$_2$O | 2.0 | 2.0 | 3.0 | 2.0 |
| MgO | — | — | — | — |
| NiO | 0.1 | 0.1 | 0.1 | 0.1 |
| CoO | 0.05 | 0.05 | 0.05 | 0.05 |
| Fe$_2$O$_3$ | — | — | — | — |
| MnO | — | — | — | — |
| OPTIMUM TREATING TEMPERATURE (°C.) | 1100 | 1030 | 1020 | — |
| OPTIMUM HEATING & COOLING RATE (°C./h) | 60 | 60 | 60 | — |
| COLOR | gray | gray | gray | — |
| ACID RESISTANCE (mg/cm$^2$) | 0.11 | 0.03 | 0.08 | — |
| ALKALI RESISTANCE (mg/cm$^2$) | 0.44 | 0.48 | 0.40 | — |
| BENDING STRENGTH (kgf/cm$^2$) | 430 | 460 | 400 | — |
| COLOR DIFFERENCE ($\Delta$E) | 2.5 | 3.7 | 2.7 | — |

Raw materials were blended and mixed into the composition of each sample shown in tables 1–4 and were melted into the molten glass for 5–20 hours at a temperature of 1300°–1500° C. Then, the molten glass was poured into water and quenched. Thus, small glass masses with particle sizes of 1–5 mm were obtained after being dried and classified. The small glass masses were placed and accumulated in a refractory mold of a desired shape with the internal surface being coated with alumina powder as a mold releasing agent, and were subjected to a heat treatment in an electric furnace. The heat treatment was carried out for 2 hours at the optimum heat treating condition shown in tables 1–4. By the heat treatment, the small glass masses were integrally fusion-bonded to one another and crystallized to produce the sample.

Nos. 1–10 samples have a white appearance, Nos. 11 and 12 samples are beige, Nos. 13, 14, 16–18 samples are gray, and No. 15 sample is black. No. 19 sample was devitrified when the molten glass was quenched and, therefore, was not subjected to any evaluation.

Nos. 1–18 samples were confirmed by the X-ray diffraction method to have $\beta$-wollastonite precipitated therein.

Those samples have excellent marble-like appearance after surface polished.

Next, those samples were subjected to measure acid resistance, alkali resistance, bending strength, and color tone stability and the results are shown in tables 1–4.

The bending strength was measured by the known four-point loading test in connection with each sample having a size of 50×250×17 mm.

In order to measure the acid resistance, each sample having a size of 25×25×5 mm was immersed in 1% water solution of H$_2$SO$_4$ for 24 hours and resultant reduced weight was measured as a factor for estimating the acid resistance.

The alkali resistance was also measured as a reduced weight after immersing each sample having a size of 25×25×5 mm in 1% water solution of NaOH for 24 hours.

In order to evaluate the color tone stability, additional samples were produced at a heat treating condition of a heating and cooling rate (that is, 120° C./hour) of two times of the optimum heating and cooling rate shown in tables 1–4 and a treating temperature by 20° C. lower than the optimum treating temperature. The heat treating time was 2 hours. A color difference ($\Delta$E) was measured by use of a color difference meter between each of the additional samples and each of samples produced with the optimum heat treatment condition. The measured color differences are shown in tables 1–4.

For comparison, those properties were measured in connection with a sample of natural marble. The acid resistance, the alkali resistance, and bending strength were 34.0 mg/cm$^2$, 3.0 mg/cm$^2$, and 170 kgf/cm$^2$, respectively.

It is seen from tables 1–3 that Nos. 1–15 samples according to the present invention have acid resistance of 0.04–0.13 mg/cm$^2$, alkali resistance of 0.40–0.48 mg/cm$^2$, and bending strength of 400–500 kgf/cm$^2$ which are all superior to those of the natural marble. The color difference is 0.2–1.2.

It is seen from table 4 that Nos. 16–19 comparative samples have acid resistance of 0.08–0.11 mg/cm$^2$, alkali resistance of 0.40–0.48 mg/cm$^2$, and bending strength of 400–460 kgf/cm$^2$ which are similar to examples of the present invention. However, the color difference is 2.5–3.7 which are higher by 1.8–2.1 than that of Nos. 13 and 14 samples having the same gray color.

Accordingly, it is noted that the samples of the present invention is superior in the color tone stability to the comparative samples.

Another examples were demonstrated to estimate affect to color by presence and absence of Li$_2$O and variation of the heat treating condition.

No. 11 sample according to the present invention and Nos. 20 and 21 comparative samples shown in table 5 were prepared by the similar manner as described above but with different heat treating conditions as shown in table 5. The color difference was also measured by the above-described manner for each of samples of different heat treating conditions and is shown in the table.

very small by change of the heat treating condition. Accordingly, the glass ceramic according to the present invention is excellent in the color tone stability and is adapted to the large-scaled production.

What is claimed is:

1. Marble-like glass ceramic which consists essentially of, by weight percent, 50–75% SiO$_2$, 1–15% Al$_2$O$_3$, 6–16.5% CaO, 0.1–5% Li$_2$O, 0–1.5% B$_2$O$_3$, 10–17.5% CaO+Li$_2$O+B$_2$O$_3$, 2.5–12% ZnO, 0–12% BaO, 0.1–15% Na$_2$O+K$_2$O, and 0–10% coloring agents, said ceramic comprising $\beta$-wollastonite precipitated as a major crystal.

2. Marble-like glass ceramic as claimed in claim 1, wherein said coloring agents comprises at least one selected from a group of Fe$_2$O$_3$, NiO, CoO, MnO$_2$, Cr$_2$O$_3$, and CuO.

3. Marble-like glass ceramic as claimed in claim 1, which further comprises at least one of As$_2$O$_3$ and Sb$_2$O$_3$ of up to 1% as refining agents.

4. Marble-like glass ceramic as claimed in claim 1, which further comprises at least one of up to 1.5% MgO and up to 1.5% SrO so as to improve meltability of the glass.

TABLE 5

| INGREDIENTS (wt %) | | SAMPLE | | |
|---|---|---|---|---|
| | | 11 | 20 | 21 |
| SiO$_2$ | | 63.9 | 64.9 | 57.9 |
| Al$_2$O$_3$ | | 5.0 | 7.0 | 7.0 |
| CaO | | 14.0 | 12.0 | 17.0 |
| Li$_2$O | | 1.0 | — | — |
| B$_2$O$_3$ | | — | — | — |
| ZnO | | 6.0 | 7.0 | 6.0 |
| BaO | | 5.0 | 4.0 | 4.5 |
| Na$_2$O | | 3.0 | 3.0 | 3.5 |
| K$_2$O | | 2.0 | 2.0 | 2.0 |
| MgO | | — | — | 2.0 |
| NiO | | 0.1 | 0.1 | 0.1 |
| OPTIMUM HEAT TREATING CONDITION | (TEMPERATURE) | 1040° C. | 1100° C. | 1000° C. |
| | (HEATING & COOLING RATE) | 60° C./h | 60° C./h | 60° C./h |
| HEAT TREATING CONDITION 1 | (TEMPERATURE) | 1070° C. | 1130° C. | 1030° C. |
| | (HEATING & COOLING RATE) | 60° C./h | 60° C./h | 60° C./h |
| COLOR DIFFERENCE | ($\Delta$E) | 0.9 | 2.0 | 2.2 |
| HEAT TREATING CONDITION 2 | (TEMPERATURE) | 1010° C. | 1070° C. | 970° C. |
| | (HEATING & COOLING RATE) | 60° C./h | 60° C./h | 60° C./h |
| COLOR DIFFERENCE | ($\Delta$E) | 1.0 | 4.1 | 4.6 |
| HEAT TREATING CONDITION 3 | (TEMPERATURE) | 1040° C. | 1100° C. | 1000° C. |
| | (HEATING & COOLING RATE) | 30° C./h | 30° C./h | 30° C./H |
| COLOR DIFFERENCE | ($\Delta$E) | 1.1 | 2.2 | 2.2 |
| HEAT TREATING CONDITION 4 | (TEMPERATURE) | 1040° C. | 1100° C. | 1000° C. |
| | (HEATING & COOLING RATE) | 120° C./h | 120° C./h | 120° C./h |
| COLOR DIFFERENCE | ($\Delta$E) | 1.2 | 4.0 | 4.2 |

In Nos. 20 and 21 samples containing no Li$_2$O, color differences changes within 2.0–4.1 and 2.2–4.6, respectively, by change of heat treating condition. However, No. 11 sample according to the present invention has color differences of 0.9–1.2 even by change of heat treating condition. That is, change of color difference is 5. Marble-like glass ceramic as claimed in claim 1, which further comprises at least one of up to 1% TiO$_2$, up to 1% ZrO$_2$, and up to 1% P$_2$O$_5$ so as to make the glass stable and less devitrifiable.

* * * * *